(12) United States Patent
Beutin et al.

(10) Patent No.: US 7,698,885 B2
(45) Date of Patent: Apr. 20, 2010

(54) CLOSURE AND LOCKING DETECTION SYSTEM FOR TURBOJET THRUST REVERSER

(75) Inventors: Bruno Albert Beutin, Evry (FR); Marc Patrick Tesniere, Champcueil (FR)

(73) Assignee: SNECMA, Paris (FR)

( * ) Notice: Subject to any disclaimer, the term of this patent is extended or adjusted under 35 U.S.C. 154(b) by 968 days.

(21) Appl. No.: 11/426,480

(22) Filed: Jun. 26, 2006

(65) Prior Publication Data
US 2007/0084191 A1    Apr. 19, 2007

(30) Foreign Application Priority Data
Jun. 30, 2005    (FR) .................................. 05 06679

(51) Int. Cl.
*F02K 3/02* (2006.01)
(52) U.S. Cl. .................................... 60/226.2
(58) Field of Classification Search ............... 60/226.2, 60/228, 230, 232, 770, 779, 39.091; 244/100 B, 244/113; 239/265.19, 265.33
See application file for complete search history.

(56) References Cited

U.S. PATENT DOCUMENTS 4,437,783 A * 3/1984 Halin et al. ................... 403/27
5,826,823 A 10/1998 Lymons et al.
6,021,636 A * 2/2000 Johnson et al. ............ 60/226.2

FOREIGN PATENT DOCUMENTS

| EP | 0 843 089 A1 | 5/1998 |
| EP | 1 457 660 A1 | 9/2004 |
| FR | 2 488 335 | 2/1982 |
| FR | 2 683 580 | 5/1993 |

OTHER PUBLICATIONS

U.S. Appl. No. 12/103,258, filed Apr. 15, 2008, Dron, et al.

* cited by examiner

*Primary Examiner*—Michael Cuff
*Assistant Examiner*—Andrew Nguyen
(74) *Attorney, Agent, or Firm*—Oblon, Spivak, McClelland, Maier & Neustadt, L.L.P.

(57) ABSTRACT

The invention relates to thrust reversers comprising at least one mobile element (3), at least one locking device (7) comprising a hook (8) cooperating with a hookable part (6) in order to keep the mobile element (3) in the closed position, and a double detection system (10) detecting closure and locking comprising a sensor (15) for indicating, in particular by a signal, if the mobile element (3) is in the closed position and if the device (7) is in a locked position.

According to the invention, the double detection system detecting closure and locking of a mobile element of a turbojet thrust reverser comprises a means (16) of detection of the hookable part (6) and of activation of a second means (17) of detection of the crooked end (13) of the hook (8).

6 Claims, 6 Drawing Sheets

CLOSURE AND LOCKING DETECTION SYSTEM FOR TURBOJET THRUST REVERSER

1-BACKGROUND OF THE INVENTION

The present invention relates to the field of aircraft turbojet thrust reversers and more particularly to the locking devices and closure and locking detection systems of such thrust reversers.

The invention applies equally to pivoting door thrust reversers, such as those fitted to the bypass turbojet shown in FIG. 1, and to thrust reversers with cascades protected by retractable shells (not illustrated) and to pivoting shell thrust reversers (not illustrated) fitted downstream of the fuselage.

In general, as can be seen in FIG. 1, turbojet 2 thrust reversers 1 comprise elements 3 that are mobile between a closed position 4 and an open position 5. The closed position 4 makes it possible to allow the flow of air or of ejected hot gases to flow freely towards the rear in order to confer, by reaction, a forward thrust to the turbojet 2 and to the aircraft. The open position 5 makes it possible to divert all or part of the flow laterally, and forwards, in order to obtain a reversal of the thrust of the turbojet 2 intended to brake the aircraft during a landing.

It is of prime importance that the mobile elements 3 of the thrust reversers 1 remain closed for the whole of the takeoff and flight time of the aircraft.

2-DESCRIPTION OF THE PRIOR ART

For this purpose, the mobile elements of thrust reversers of known type are held in the closed position by a redundant locking system comprising primary, secondary and possibly tertiary locking devices, as described for example in the patent EP-A-0 843 089.

This system uses a large number of sensors in order to monitor the status of all of the locks and the closure of each mobile element of the thrust reverser, one sensor being allocated to each of the primary, secondary and tertiary locks respectively, other sensors furthermore being disposed close to the closure position of the mobile element in order to check its closure.

These sensors are intended to be connected to a monitoring unit for checking, in the piloting position, that the thrust reversers of the aircraft's jet engines are correctly closed and locked.

The disadvantage is that the unit has a small number of inputs, only one or two inputs being allocated to each mobile element, and that because of the large number of sensors it is not possible to connect all of these sensors directly to the monitoring unit.

It is therefore a matter of connecting the monitoring unit to only one or two detectors per mobile element in order to monitor both that the mobile element is correctly closed and that the locking device is correctly engaged.

The document FR-A-2 488 335 precisely describes a locking device for a mobile element of a cascade thrust reverser provided with a system making it possible to detect both the arrival of the mobile element in the closed position and the actuation of the locking device. This locking device comprises:

a hook permanently fixed to the mobile element,
a pivoting latch provided with a hookable pin cooperating with the hook, and
a double detection system detecting the closure and the locking of the mobile element of the thrust reverser, the system comprising a sensor upon which acts a lever actuated by the closure of the mobile element and by the pivoting of the locking latch.

The lever is hinged on the pivoting part of the locking latch and comprises two arms, one of them in contact with the base of the hook of the mobile element and the other one with the sensor.

A disadvantage of this detection system is that it does not make it possible to detect a failure when one of the parts cooperating in the locking is damaged. In such cases, for example if the crooked point of the hook is broken or if the holding pin is torn off or if the mobile element (door) is buckled, the detection devices of known type can give an indication according to which the mobile elements of the thrust reverses are correctly closed and the locks are correctly engaged, even though there is a risk that an incorrectly locked mobile element will open in flight, particularly on takeoff, which is the worst of circumstances.

The purpose of the invention is to overcome the disadvantages of present solutions and to provide a system for detecting the closure and locking of a mobile element of a turbojet thrust reverser which makes it possible to detect damage of the parts which cooperate in the locking, in particular a fracture of a part of a primary locking device with a hook and a hookable pin, such as a fracture of the crooked point of the hook and/or a destruction of the hookable pin.

In particular, it is a matter of using a single detection sensor to provide a double function: detecting the presence of the locking pin in the closed position and the presence of the point of the locking hook in the engaged position in order to obtain just one or two signals for each monitored mobile thrust reverser element and to connect the closure and locking detection systems of the mobile elements directly to some inputs available for this purpose on a monitoring unit such as presently installed in aircraft.

3-SUMMARY OF THE INVENTION

These objectives are achieved according to the invention with a locking device having a hook and a hookable pin, the locking device being provided with a double detection system making it possible to ascertain both the closure of the mobile element and the engagement of the locking device, by means of a combination of a means of detecting the closure of the hookable pin of the mobile element and a means of detection of the point of the locking hook in the position of being engaged on the pin, the detection means acting in combination on a sensor, the sensor being actuated only when the locking pin is in the closed position and when the crooked point of the hook is in the position of being engaged with the pin.

Thus, the double detection system has the functions, on the one hand, of detecting the presence of the locking pin in the place corresponding to the end of closure travel of the mobile element, a place which corresponds to its position of engagement with the hook and, on the other hand, of detecting the presence of the point of the crooked part of the hook in the place corresponding to its position of engagement on the pin.

Advantageously, such a system makes it possible to verify the cumulative condition in which the locking pin is in the closed position and in which the locking hook is in the engaged position, which is the combined condition which makes it possible to ascertain that the mobile element is correctly in the closed position with a sound locking pin and that the locking is effective with a hook that is sound up to its point.

The invention relates to a device for locking a mobile element of a thrust reverser, comprising:
- a hook having a crooked end,
- a hookable part intended to be mounted on the mobile element and to cooperate with said hook, and
- a double detection system detecting closure and locking comprising a sensor, with the feature that it furthermore comprises a first means of detecting the hookable part and of activation of a second means of detection of the crooked end of the hook.

Preferably, the first means of detection comprises a setting lever.

Preferably, the hook and the setting lever are hinged about the same axis.

Preferably, the setting lever comprises two arms situated on either side of the axis, the first arm having an end able to come into contact with the hookable part, the second arm having an end connected to the second detection means.

Preferably, the second means comprises a floating part serving as a follower and/or at least one mobile part connected to the sensor in order to detect the presence of the crooked part of the hook at the location of the engaged position.

The invention applies to a primary locking device of the mobile element.

The invention also relates to a thrust reverser comprising at least one mobile element provided with such a locking device.

The invention also applies to a turbojet provided with a thrust reverser equipped with the locking device.

4-DESCRIPTION OF THE DRAWINGS

Other features or advantages of the invention will appear clearly in the continuation of the description given by way of non-limiting example and with reference to the appended drawings in which:

FIG. 1, mentioned previously, is a cutaway view of a turbojet provided with pivoting door thrust reversers of known type, the upper half-view showing a thrust reverser door in the closed position and the lower half-view showing an open thrust reverser door;

Figure 10:
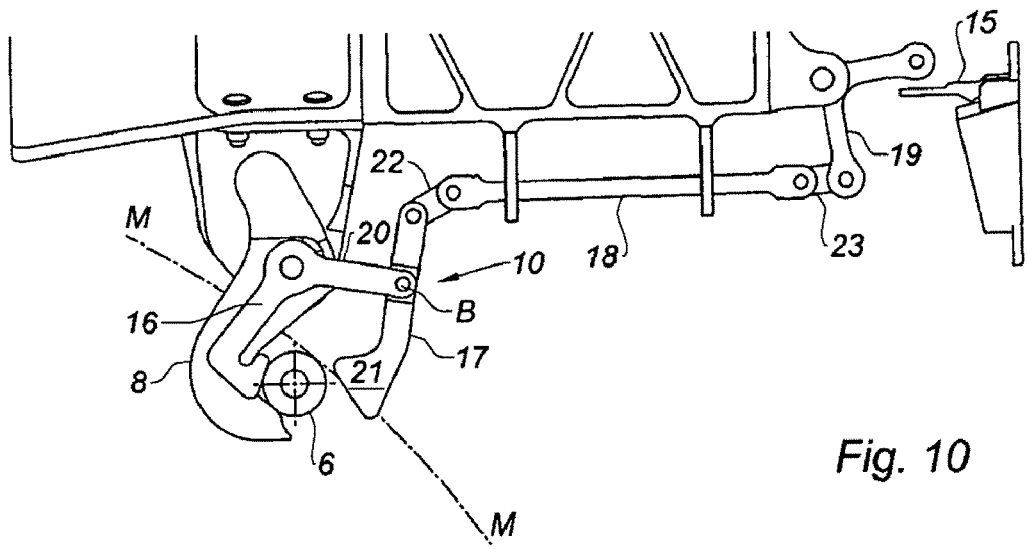
Figure 11:
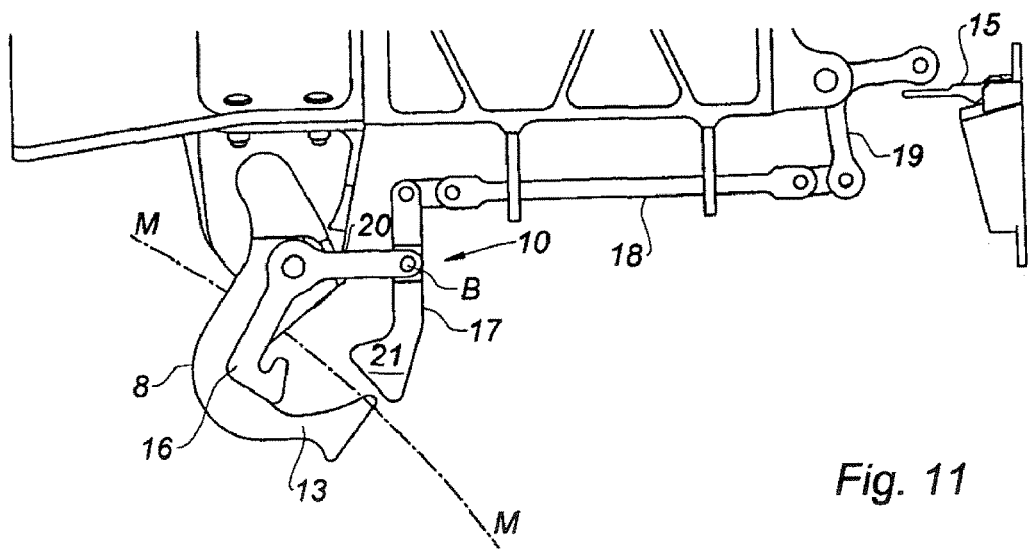

FIGS. 5 to 9 are plane views of the locking device provided with the detection system according to the invention, during a closing phase, each view showing the device when, respectively:
- the door is open and the locking pin is in the disengaged position,
- the door is in the process of closing, the pin coming into contact with the detection system,
- the pin engages the closure detection system,
- the locking hook engages the pin of the door,
- the locking hook is fully engaged and actuates the closure and locking detection system according to the invention;

FIG. 10 is a plane view of the locking device provided with the detection system according to the invention, when the pin and the locking hook are engaged but the crooked point of the hook is broken; and, FIG. 11 is a plane view of the locking device provided with the detection system according to the invention, when the locking pin of the door is missing.

5-DESCRIPTION OF THE PREFERRED EMBODIMENT

Figure 2:
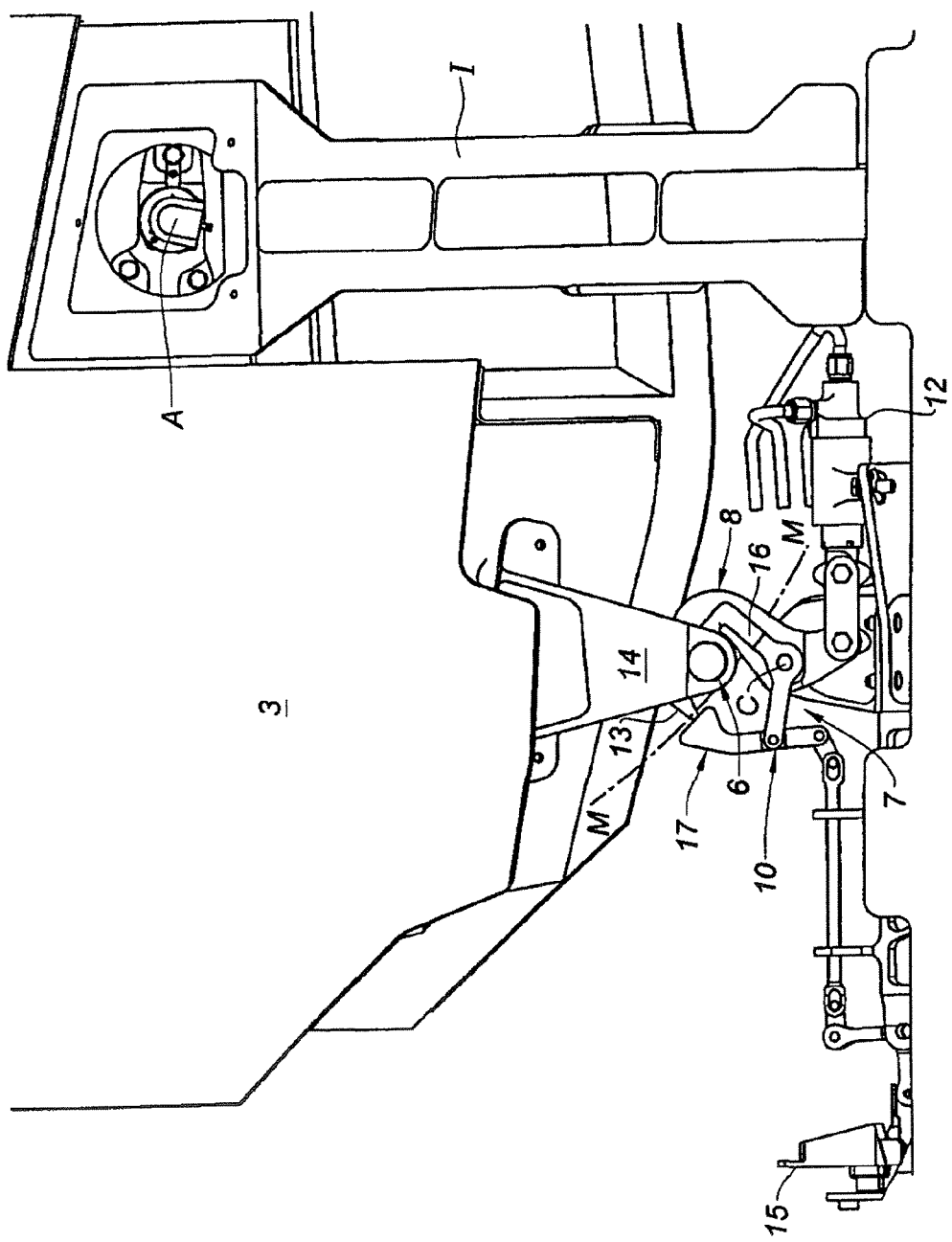
FIG. 2 is a bottom view of a thrust reverser door held in the closed position by a locking device provided with a closure and locking detection system according to the invention.

FIG. 2 shows a mobile element 3 of a turbojet thrust reverser, represented in this example by a pivoting door 3 comprising a fitting 14 provided with a locking pin 6, the door being held in the closed position by a locking device 7 having a pivoting hook 8 provided with a combined closure and locking detection system 10 according to the invention. The system makes it possible to verify both that the pin 6 of the mobile element 3 is in the closed position and that the crooked part 13 of the locking hook 8 is in the engaged position.

Figure 1:
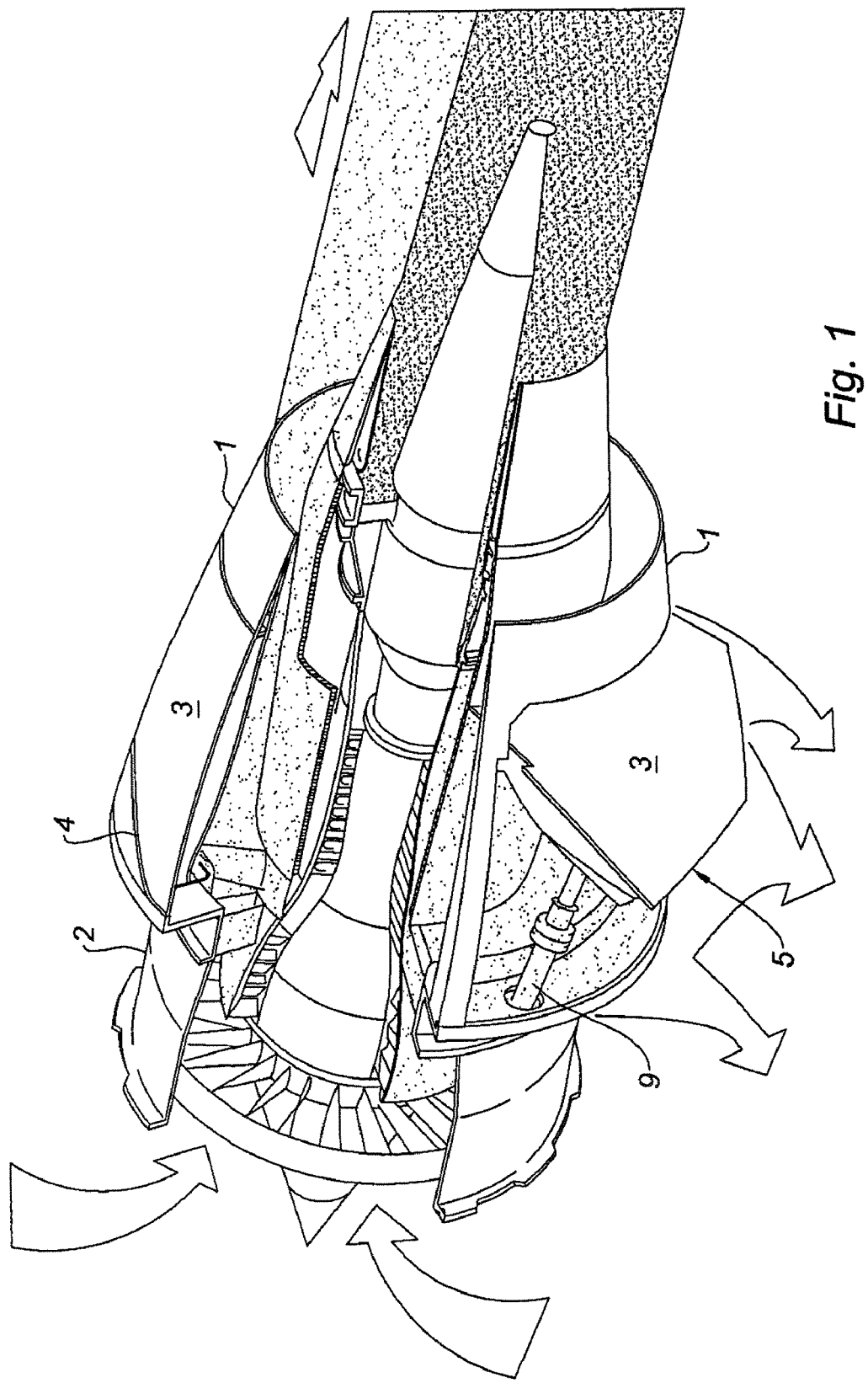

The mobile door 3 shown here can be the left door of the thrust reverser in plan view or, conversely, the right door in bottom view. The door 3 is mounted on a spindle A borne by an intermediate frame I (transverse member) of the chassis of the turbojet's nacelle. The door 3 opens outwards (towards the top of the figure) by carrying out a movement of rotation indicated by a dotted line M-M under the effect of an actuator such as a jack 9, which can be seen in FIG. 1. The door 3 is generally held by a secondary locking device acting in order to lock the jack, by a tertiary locking device (not visible) mounted in the median part of the outer edge of the door 3 and by two primary locking devices 7 anchored in the two opposite lateral edges of the door. Just one of the primary locking devices 7 appears in the foreground in FIG. 2.

The primary locking device 7 comprises a pivoting hook 8, integral with the chassis of the nacelle, and a locking pin 6 (or any other type of hookable part) integral with a fitting 14 fixed to the mobile element 3.

Figure 3:
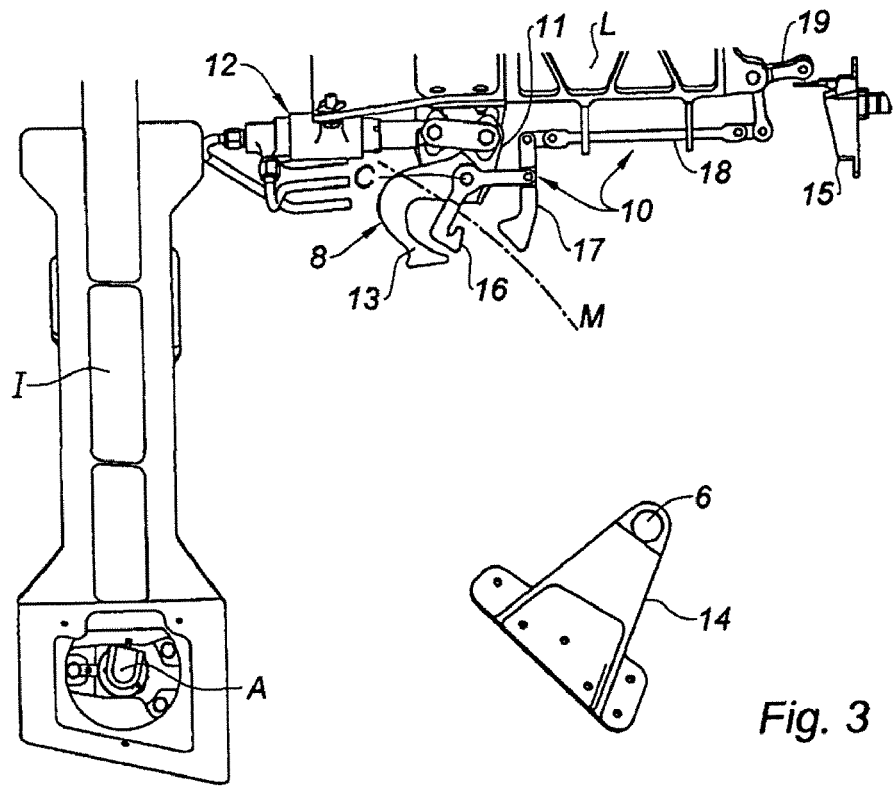
FIGS. 3 and 4 are bottom views of the locking device and of the detection system according to the invention, when the door fittings are open and then closed respectively.
Figure 5:
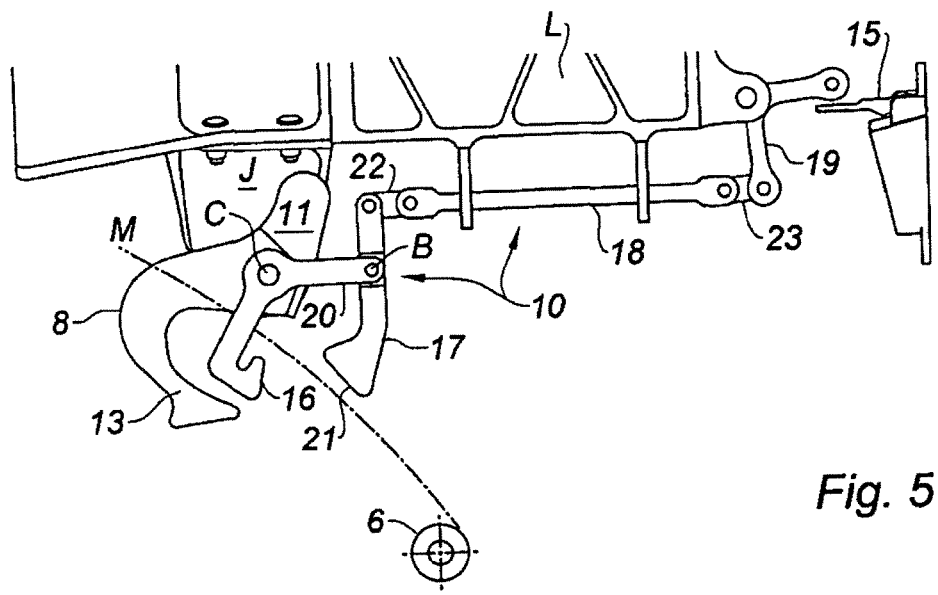

According to the embodiment shown in FIGS. 3 and 5, the hook 8 pivots about a spindle C borne by an element J integral with a longitudinal beam L of the chassis of the turbojet's thrust reverser nacelle. The hook 8 comprises, on one side of the spindle C, an operating part 11 connected to an actuating jack 12 and, on the other side of the spindle C, a crooked part 13 providing a housing for the locking pin 6 and ending in a point which transversely intersects the line of the trajectory M-M of the pin.

The locking pin 6 is borne by fittings 14 integral with the mobile door 3, the axis of the pin 6 being substantially parallel with the spindle A of the mobile door 3.

Figure 4:
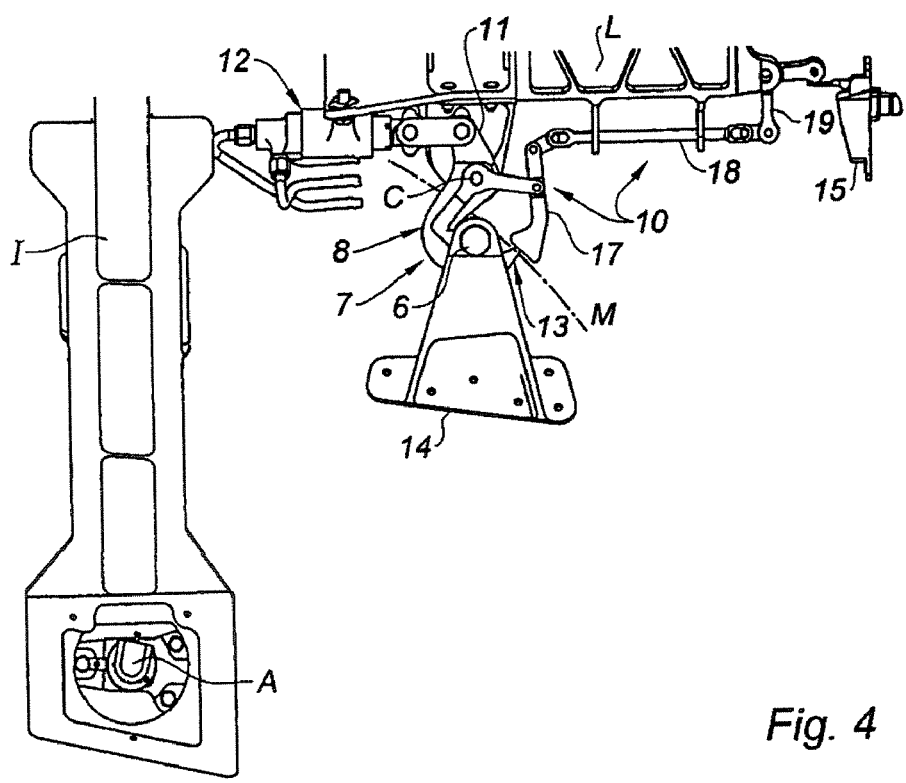

As shown in FIG. 4, the double detection system 10 associated with the locking device 7 comprises a sensor 15. The sensor 15 is for example an electrical contactor or a proximity sensor. Provision is made for the double detection system, according to the invention, to deliver an electrical signal solely if the locking pin 6 is in the position of engagement (which implies that the mobile element 3 is in the closed position) and if the hook 8 is engaged. The sensor 15 is therefore, as shown in FIG. 4, in a closed state allowing the transmission of an electrical signal when the system 10 detects both the presence of the locking pin 6 in the closed position and the presence of the crooked point 13 of the hook 8 in the engaged position (a cumulative condition).

According to the embodiment shown in FIGS. 2 to 11, the detection system 10 comprises a pivoting lever 16, a floating part 17 serving as a follower, and a mechanical actuation transmission 18 ending at a sensor 15 of the electromagnetic type.

The lever 16 is mounted parallel with the hook 8 and such that it pivots about an axis, in this case merged with the spindle C of the hook. The lever 16 comprises two arms disposed on either side of the pivoting spindle C, the first arm 16 fitting inside the crook of the hook 8, transversely with respect to the trajectory M-M of the pin, the second arm 20 being hinged at its end with the floating part 17. The part 17 is mounted, freely pivoting, on a hinge spindle B at the end of the second arm 20. The lever 16 has the shape of a boomerang, the two arms forming an obtuse angle. The floating part 17 comprises two parts, one on each side of its hinge spindle B on the lever 16, the first part forming a head 21 with a flattened face which, in the rest state, is located at the periphery of the trajectory M-M of the pin, the second part of the floating part 17 being hinged with mechanical transmission rods 18 ending at a bell-crank lever 19 acting on the sensor 15.

A first spring (not visible in the figures) returns the first arm of the lever 16 towards the locking pin 6 (anti-clockwise rotation of the lever 16). A second spring (not shown) returns the locating part 17 and the mechanical transmission parts 18 for actuating the sensor 15 in such a way as to distance the second arm of the bell-crank lever 19 from the sensor 15 (clockwise rotation of the floating part 17).

The mechanical transmission comprises a rod 18, a bell-crank lever 19 and two links 22, 23 connecting the second part of the floating part 17 to one end of the rod 18 and the other end of the rod 18 to a first arm of the bell-crank lever 19 respectively. The bell-crank lever 19 comprises a second arm disposed close to the sensor 15 in order to act on the latter.

When, as shown in FIGS. 3 and 5, the door 3 is in the open position, and therefore the locking pin 6 is out of its closed position and the locking hook 8 is in the disengaged position (unlocked), the floating part 17 is moved by the lever 16 away from the trajectory M-M of the pin and out of range of the hook 8. The bell-crank lever 19 does not act on the sensor 15.

When, as shown in FIG. 4, the door 3 is in the closed and locked position, that is to say the locking pin 6 is in the closed position with the hook 8 and the hook is in the engaged position, the lever 16 returns the floating part 17 towards the position of the hook and the point 13 of the hook causes the floating part 17 to pivot such that the mechanical transmission 18-19 acts on the sensor 15. The sensor is therefore in a closed state allowing the transmission of an electrical signal which indicates the completion of the double condition: the presence of the hookable pin 6 in the closed position and the presence of the crooked point 13 of the hook 8 in the engaged position, which signifies that the door is correctly closed and correctly locked.

FIGS. 5 to 9 show details of the successive configurations of the detection system 10 during a phase of closing the mobile element.

FIG. 5 shows the state of the detection system 10 when the mobile element 3 is in the open position, that is to say the locking pin 6 is far from its closed position with the hook and the locking hook 8 is in the disengaged position. The lever 16, under the action of the first spring, moves the floating part 17 out of the trajectory M-M of the pin and distanced from the position occupied by the point 13 of the hook 8 in the engaged position. The mechanical transmission 18 pushes the bell-crank lever 19 back under the effect of the second spring and does not act on the sensor 15 (open contact) which does not deliver a signal.

Figure 6:
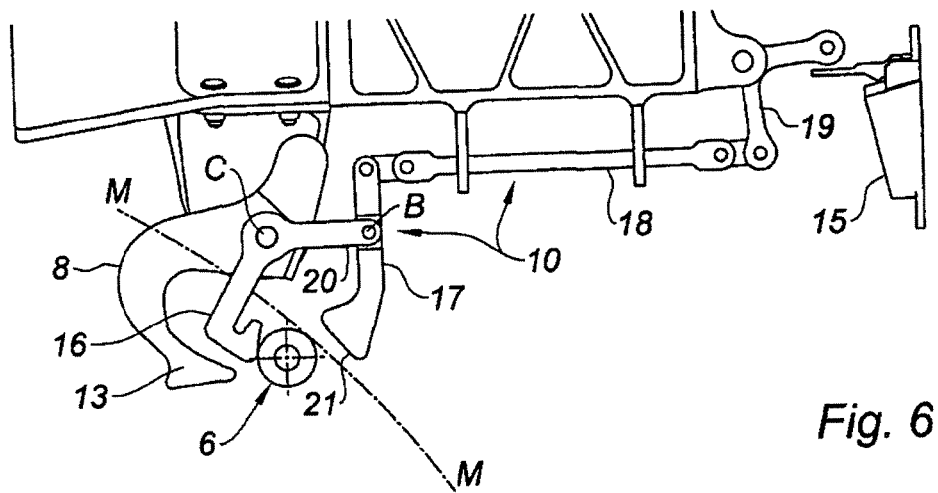

In FIG. 6, the mobile element is closing and it can be seen that the locking pin 6 comes into contact with the lever 16.

Figure 7:
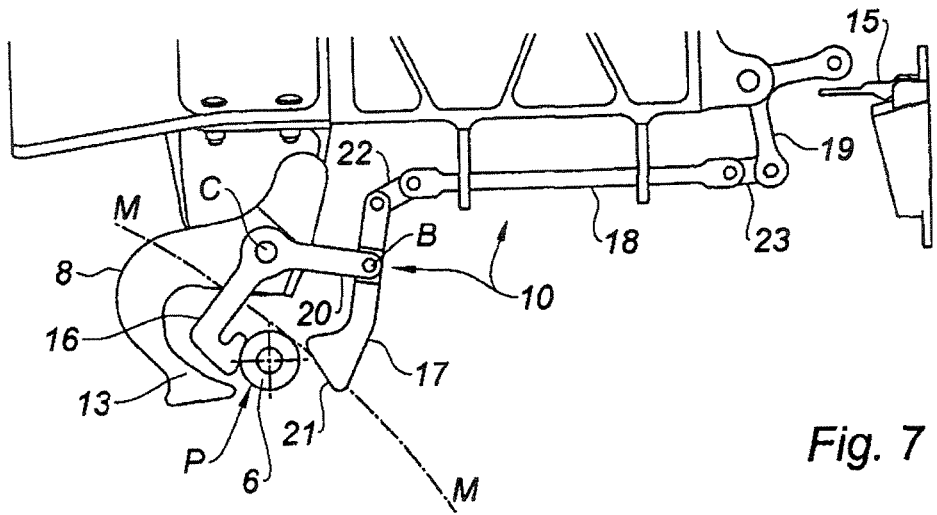

When, as shown in FIG. 7, the mobile element fully reaches its closed position, the locking pin 6 comes into its closed position P and pushes the lever 16 back which returns the floating part 17 towards the inside of the trajectory M-M of the pin and towards the hook 8. However, such a shift of the floating part 17 does not apply traction to the mechanical transmission 18. In fact, the floating part 17 and the link 22 between that part 17 and the transmission rod 18 exhibit a margin of play in the pivoting sense. The transmission 18, under the effect of the second return spring, keeps the bell-crank lever 19 separated from the sensor 15 (contact open, no signal).

Figure 8:
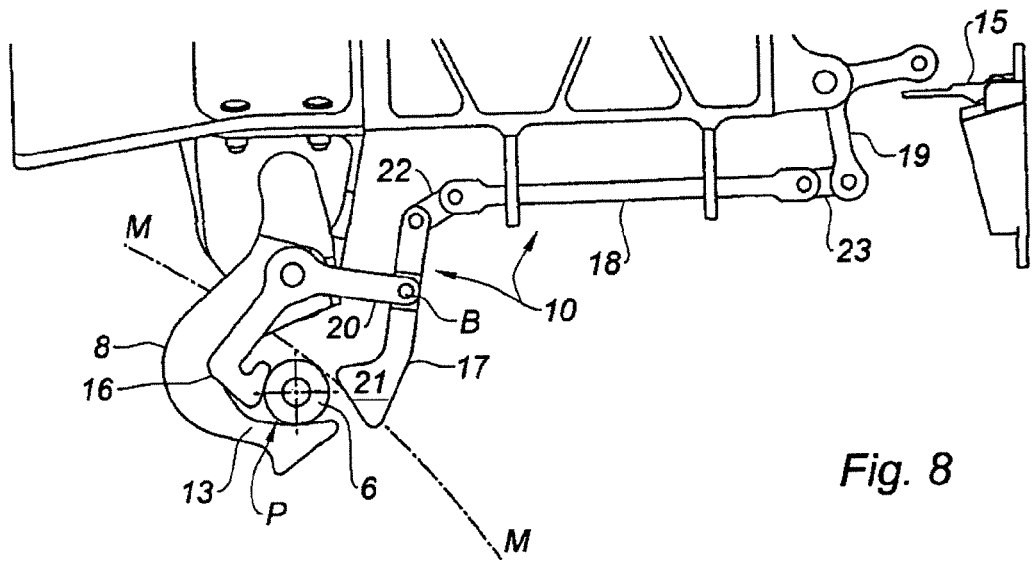

In FIG. 8, the pin 6 is in the closed position P and the hook 8 is actuated by the jack (not shown) towards an engaged position in order to lock the pin 6 in its closed position P and to hold the mobile element. As long as the point 13 of the hook has not reached the head 21 of the floating part 17, the bell-crank lever 19 of the transmission 18 has no action on the sensor 15.

Figure 9:
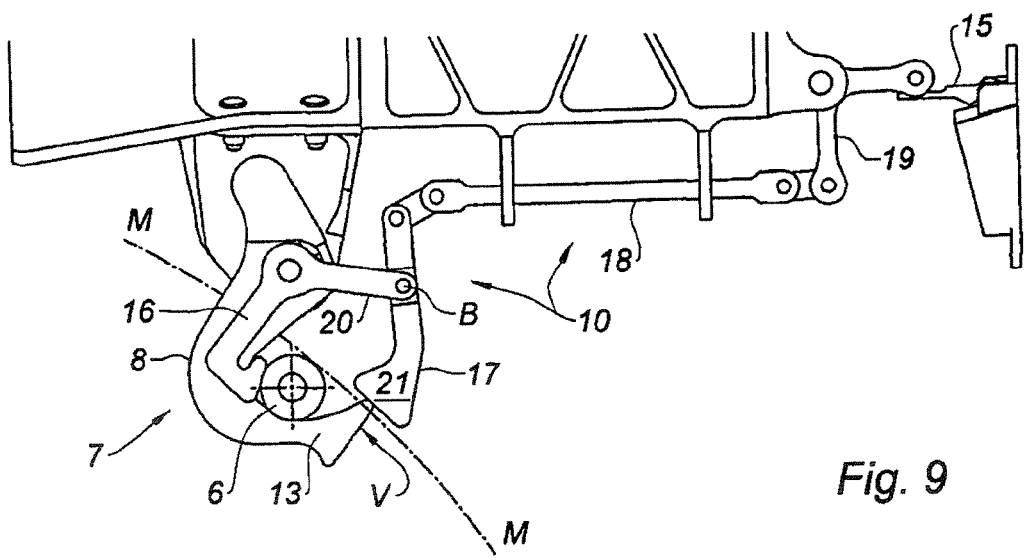

FIG. 9 shows the configuration of the locking device 7 and of the double detection system 10 detecting closure and locking according to the invention, when the hook 8 fully reaches its engaged position V and the crooked point 13 of the hook 8 pushes the floating part 17 whose head 21 was occupying the said position V.

The head 21 of the floating part 17 has a transverse flattened face, which is preferably perpendicular to the travel of the hook 13 and therefore substantially parallel with the trajectory M-M of the pin 6.

When the hook 8 fully reaches the engaged position V, the crooked point 13 of the hook strikes the flattened face of the head 21 of the floating part 17 and pushes it back out of the engaged position V, beyond the trajectory M-M of the pin. The floating part 17 pivots about its hinge axis B on the lever 16, immobilized by the engagement of the locking pin 6. The pivoting of the floating part 17 applies traction to the mechanical transmission assembly 18 (links, rod and bell-crank lever) which pulls the bell-crank lever 19 despite the effect of the second return spring. The bell-crank lever 19 acts on the sensor 15 in such a way as to close the contact and to transmit an electrical signal.

The double detection system 10 therefore makes it possible to indicate, by a single signal, the fulfillment of the combined condition in which the locking pin 6 is in the closed position P and the crooked point 13 of the hook 8 is in the engaged position V.

Thus the locking device provided with the detection system according to the invention makes it possible to verify simultaneously that the locking pin is sound and in the closed position and that the locking hook is sound and in the engaged position, and therefore that the mobile element is correctly closed and locked.

FIG. 10 illustrates the functioning of the detection system 10 according to the invention in the case of failure at the level of the hook 8, for example when the jack does not actuate the hook or when the weakest part of the hook 8 formed by the pointed end of the crooked part is broken, as illustrated here. The locking pin 6 of the mobile element is in the closed position and pushes the lever 16 which returns the floating part 21 to within the trajectory M-M. The hook 8 is actuated in the locking direction by the jack 12 but the floating part 17, serving as a follower, detects the absence of the point of the crooked part of the hook 8 at the place normally corresponding to its engaged position. The floating part 17 and the mechanical transmission 18 are not acted upon and the bell-crank lever 19 does not act on the sensor 15 (contact open) which does not transmit a signal.

The system therefore makes it possible to detect cases of failure in which the crooked part of the hook is absent from the engaged position, even if the locking pin is in the closed position.

FIG. 11 illustrates another case of failure at the level of the locking pin, for example if the pin is missing, destroyed or is bent and the pin does not reach the engagement position.

Because of the absence of the locking pin, the lever 16 shifts the floating part 17 out of range of the hook, beyond the normal trajectory of the pin indicated by the dotted line M-M. When the hook 8 is actuated by the jack 12 and reaches the place normally corresponding to its engaged position (arrival of the hook at the end of its travel), the point 13 of the hook cannot act on the floating part 17 and the mechanical action transmission 18 is not acted upon. The sensor 15 is in the open contact state and does not deliver a signal.

Thus, the double detection system according to the invention makes it possible to detect, and to indicate by the absence of signal, all of the failures in which the crooked part of the hook is absent from the engaged position or in which the hookable part is absent from the closed position.

The double detection system according to the invention can of course detect other cases of failure, in particular a conjunction of failure of the hook and failure of the locking pin, these two complementary parts having been torn off, for example.

The double detection system according to the invention preferably applies to the primary locking devices generally mounted on the two lateral edges of the frame of each mobile element of a turbojet thrust reverser.

It should be noted that this double detection is advantageously obtained with the use of a single sensor delivering a single signal and that the signal is active (contact closed) when there is no fault, in accordance with the fault detection rules in the aeronautical field.

Advantageously, the invention makes it possible to equip each mobile element with two detection systems mounted on the two lateral primary locking devices of the mobile element and to connect the two sensors of the two double detection systems according to the invention to two respective inputs of a monitoring unit, in particular of the FADEC type, or of a Digital Electronic Control Unit (DECU) in order to monitor the state of each of the mobile elements of the aircraft's thrust reversers.

However, the double detection system according to the invention can be fitted to other categories of thrust reverser mobile element locking devices, in particular to a secondary or tertiary locking device.

Moreover, even though the example embodiment described in this document refers to a pivoting door, the invention applies to any type of thrust reverser mobile element, in particular to retractable shell or panel thrust reversers or to pivoting shell thrust reversers mounted downstream of certain single flow turbojets.

It should be noted that, in the rest state, the device according to the invention does not bear any mechanical force apart from the pressing of the detection lever 16 on the locking pin 6 and the pressing of the point of the hook 13 on the follower 17 of the detection system. Consequently, the system, in normal operation, is subjected very little to mechanical fatigue and has a long service life.

The invention claimed is:

1. A device for locking a mobile element of a thrust reverser, comprising:
   a hook including a crooked end;
   a hookable part which is mounted on the mobile element and cooperates with said hook; and
   a double detection system which detects closure and locking of the mobile element comprising a sensor, a setting lever, and a floating part,
   wherein the hook and the setting lever are hinged about a common axis and are independently rotatable,
   wherein the setting lever includes a first arm which extends from the axis in a first direction and a second arm which extends from the axis in a second direction,
   wherein the floating part is hingedly connected to an end portion of the first arm of the setting lever,
   wherein the hookable part cooperates with the hook and contacts an end portion of the second arm of the setting lever when the mobile element is closed, and
   wherein the crooked end of the hook contacts an end portion of the floating part when the mobile element is locked.

2. The device as claimed in claim 1, wherein the floating part is connected to a mechanical actuation transmission, and the mechanical actuation transmission actuates the sensor when the mobile element is closed and locked.

3. A thrust reverser comprising at least one mobile element provided with a hookable part and at least one locking device as claimed in claim 1.

4. A turbojet provided with a thrust reverser as claimed in claim 3.

5. The device as claimed in claim 1, comprising a first spring which returns the second arm of the setting lever towards the hookable part.

6. The device as claimed in claim 2, comprising a second spring which returns the floating part and the mechanical actuation transmission away from the sensor.

* * * * *